B. VOLKMAR.
PROTECTIVE CASING.
APPLICATION FILED DEC. 9, 1909.
1,013,850.
Patented Jan. 2, 1912.
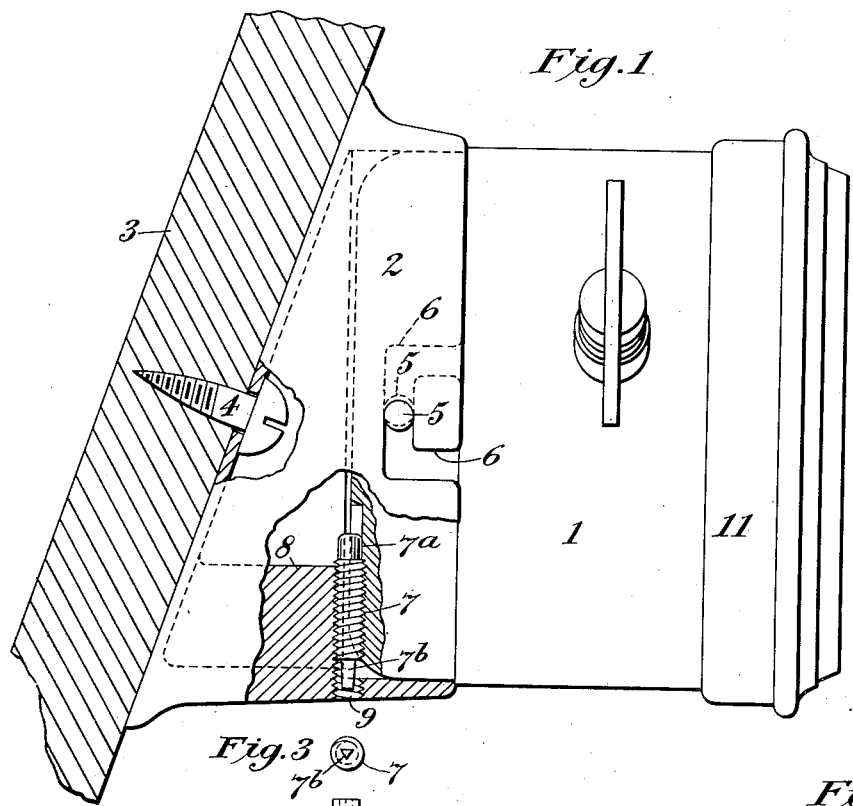
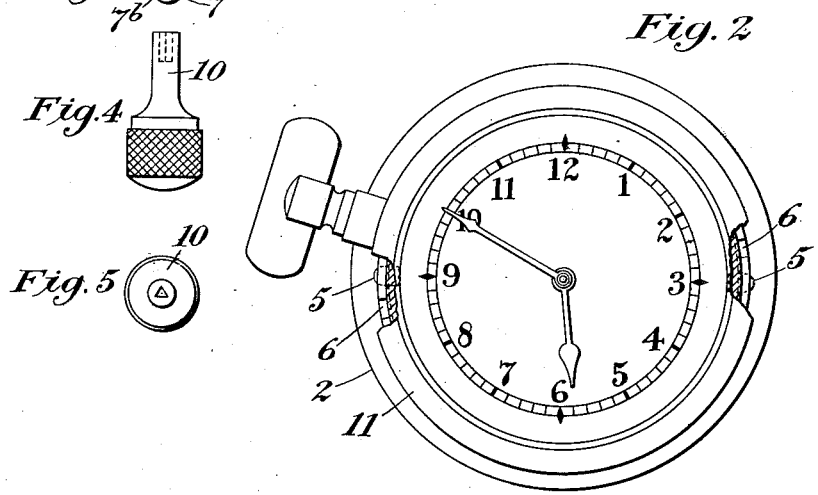
Witnesses:
Inventor:
Bernhard Volkmar
by Henry D. Williams
Attorney.

UNITED STATES PATENT OFFICE.

BERNHARD VOLKMAR, OF NEW YORK, N. Y., ASSIGNOR, BY MESNE ASSIGNMENTS, TO CONRAD HUBERT, OF NEW YORK, N. Y.

PROTECTIVE CASING.

1,013,850.      Specification of Letters Patent.      Patented Jan. 2, 1912.

Application filed December 9, 1909. Serial No. 532,177.

*To all whom it may concern:*

Be it known that I, BERNHARD VOLKMAR, a citizen of the United States, residing at the borough of the Bronx, city of New York, in the county of New York and State of New York, have invented certain new and useful Improvements in Protective Casings, of which the following is a specification, reference being had therein to the accompanying drawings, forming part thereof.

My invention relates to protective casings adapted to prevent theft or unauthorized access.

Some of the objects of my invention are simplicity and inexpensiveness of construction and neatness of appearance.

Other objects and advantages will appear from the following description.

My invention includes two casing parts secured together by rotational engagement and a locking pin entering a pin-receiving opening between the parts formed by registering notches on each of the parts so that the locking pin prevents disengaging rotation of the parts.

My invention also includes the combination with such locking means of means for securing the casing to a support accessible for release only from within the casing.

My invention also includes several details of construction and combinations of parts, as will hereinafter appear.

I shall now describe my invention with referenuce to the accompanying drawings and shall thereafter point out my invention in claims.

Figure 1 is a side view, partly broken away, to show the locking means and the securing device. Fig. 2 is a front view, partly broken away, to show the engaging means between the two parts of the casing. Fig. 3 is a detail showing the locking pin as viewed from the lower side of Fig. 1. Fig. 4 is a side view of the unlocking key. Fig. 5 is an end view of the same as viewed from the top of Fig. 4.

My invention may be employed to prevent theft of the contents or unauthorized access to the interior of the casing; also to prevent theft of or unauthorized removal of the casing itself; or the invention may be at the same time employed for both of these purposes.

In the accompanying drawings, the invention is shown as employed to prevent the theft or unauthorized removal of a clock from a support to which it is secured. This arrangement is of particular utility in reference to vehicles, such as automobiles, in which the clock and other registering and recording instruments are greatly exposed to theft. In the illustrated embodiment of the invention, the clock casing 1 forms also the front part of the protective casing, of which the back part 2 is secured to a support 3, which may be the dashboard of a vehicle.

The rear part 2 of the two-part casing is shown as secured to the support 3 by a screw 4, of which there may be any desired number, entering the support 3 and having a head located within the part 2 and covered by the part 1, such screw 4 constituting securing means releasable only by first obtaining access to the interior of the casing.

The two parts 1 and 2 of the casing are secured together by rotational engagement, the front part 1 being shown as provided with pins 5 engageable in bayonet slots 6 in the edge of the rear part 2, and the front part 1 is shown as telescoping into the rear part 2. Locking means are provided to prevent rotational disengagement of the two parts of the casing. A screw-threaded locking pin 7 engages in corresponding screw-threaded notches in the inner side of the part 1 and in a lug 8 at the inside of the casing part 2, the part 2 having a screw-threaded hole 9 to provide for the insertion and removal of the locking pin 7. The locking pin 7 is provided with a smooth rounded inner end $7^a$ to produce easy starting of the locking pin. At its outer end the locking pin is provided with a reduced triangular portion $7^b$ engageable by a correspondingly formed key 10 adapted to be used to insert or remove the locking pin. When the locking pin 7 is fully inserted in locking position, as shown in Fig. 1, the outer end of the outermost portion $7^b$ of the locking pin is countersunk or sunk to some distance inward from the outer surface of the rear casing part 2.

When the two parts 1 and 2 of the casing are engaged, then the rounded screw-threaded grooves in the respective casing parts will be in alinement to jointly receive the screw-threaded locking pin 7, as shown in Fig. 1. Because of the shape of the end $7^b$ of the locking pin 7 and its countersunk relation to the outer surface of the casing, such locking pin is protected against removal except by use of the key 10.

It is evident from the above description that the front casing part 1, which also in this instance constitutes a portion of the clock casing, is protected against unauthorized removed from the rear casing part 2 and also that the rear casing part 2 is protected against removal from its support 3. By the employment of the means of the invention hereinbefore described, a substantial measure of security is afforded against theft of the clock, together with a neat and finished appearance.

In the construction shown in the drawings it is not necessary to entirely remove the locking pin 7 in order to separate the two parts 1 and 2 of the casing. As may be seen in Fig. 1, the corner of the inner side of the part 1 is rounded to a considerable extent. By reason of this construction the locking pin 7 may be unscrewed sufficiently to disengage the part 1 while the threads of the locking pin are still engaged with the threads of the hole 9 in the part 2. This avoids the liability of losing the locking pin 7 in the operation of removing and replacing the clock of which the outer casing part 1 forms a part.

The clock is shown as provided with a front cover 11, which may be screwed upon the casing part 1 in the usual manner and may be locked in place thereon by the same kind of locking devices as are shown and described to prevent disengaging rotation of the parts 1 and 2. In fact, substantially any two parts having a rotational engagement may be locked against disengagement by means of the device of the present invention.

It is obvious that various modifications may be made in the construction shown and above particularly described within the principle and scope of my invention.

I claim:

1. A protective inclosing casing comprising two parts secured together by rotational engagement, means for securing the casing to a support, such means being inaccessible for release when the parts are secured together, the parts being provided with notches on opposed faces arranged to register when the parts are engaged to form a pin-receiving opening between the parts, and means for preventing disengaging rotation of the parts comprising a pin entering the opening between the parts.

2. A protective inclosing casing comprising two parts secured together by rotational engagement, means for securing the casing to a support, such means being inaccessible for release when the parts are secured together, a screw-threaded notch being provided in each of the two parts, the two notches being on opposed faces of the parts and arranged to register when the parts are engaged to form a pin-receiving threaded opening between the parts, and a screw-threaded locking pin engageable in the threaded opening between the parts.

3. A protective inclosing casing comprising two parts secured together by rotational engagement, means for securing the casing to a support, such means being inaccessible for release when the parts are secured together, a screw-threaded notch being provided in each of the two parts, the two notches being on opposed faces of the parts and arranged to register when the parts are engaged to form a pin-receiving threaded opening between the parts, a screw-threaded locking pin engageable in the threaded opening between the parts and constructed so as to be countersunk therein when in engaged and locking position and having its outer end formed to receive a key, and a key conformed to the outer end of the pin and adapted to enter the pin receiving opening and to rotatively engage the pin.

In testimony whereof I have affixed my signature in presence of two witnesses.

BERNHARD VOLKMAR.

Witnesses:
  Wm. Ashley Kelly,
  Victor D. Borse.